June 21, 1932. W. L. HANLEY, JR., ET AL 1,863,628
PLANT FOR THE MANUFACTURE OF CERAMIC PRODUCTS
Filed Feb. 4, 1928  5 Sheets-Sheet 5

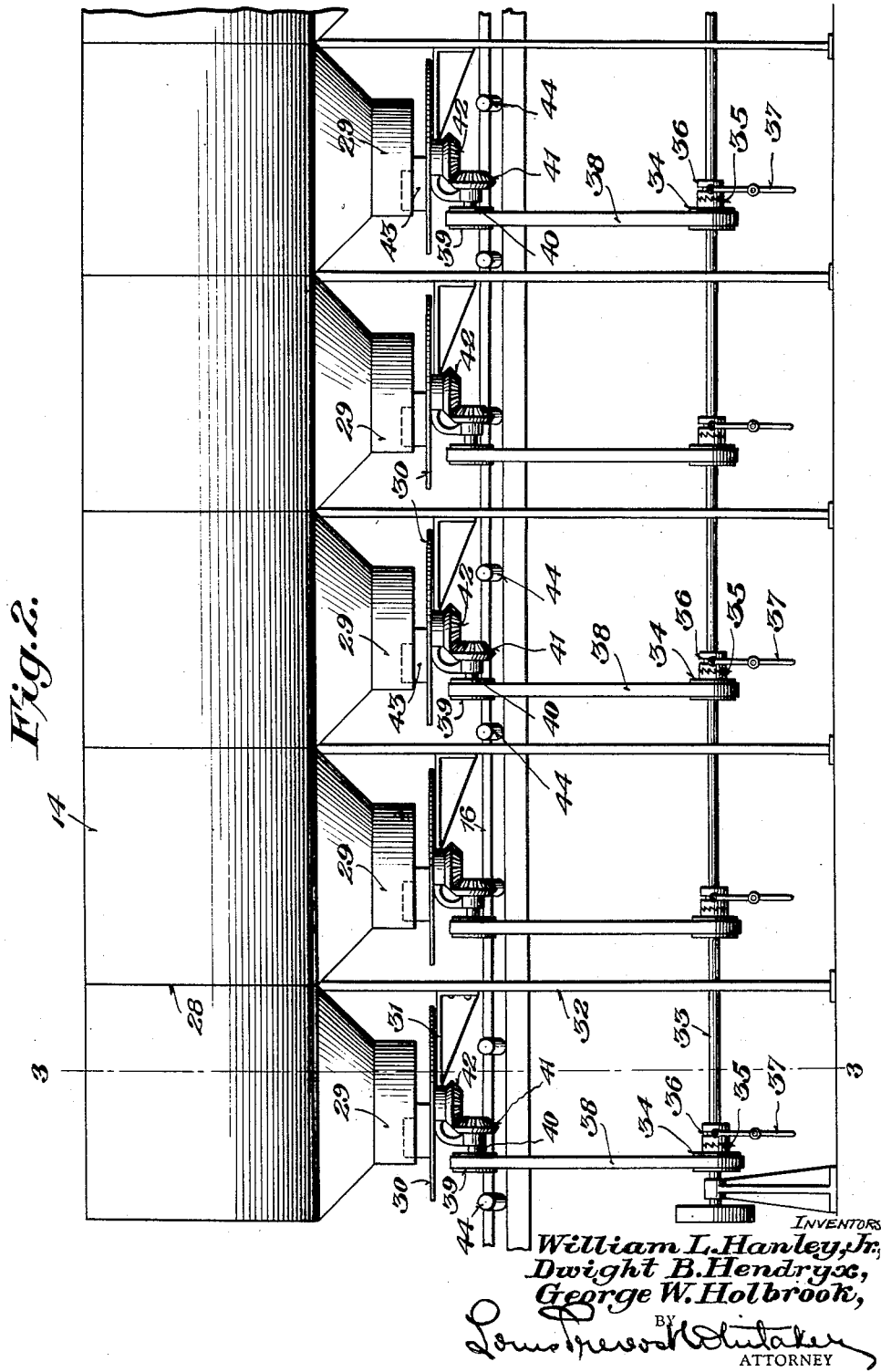

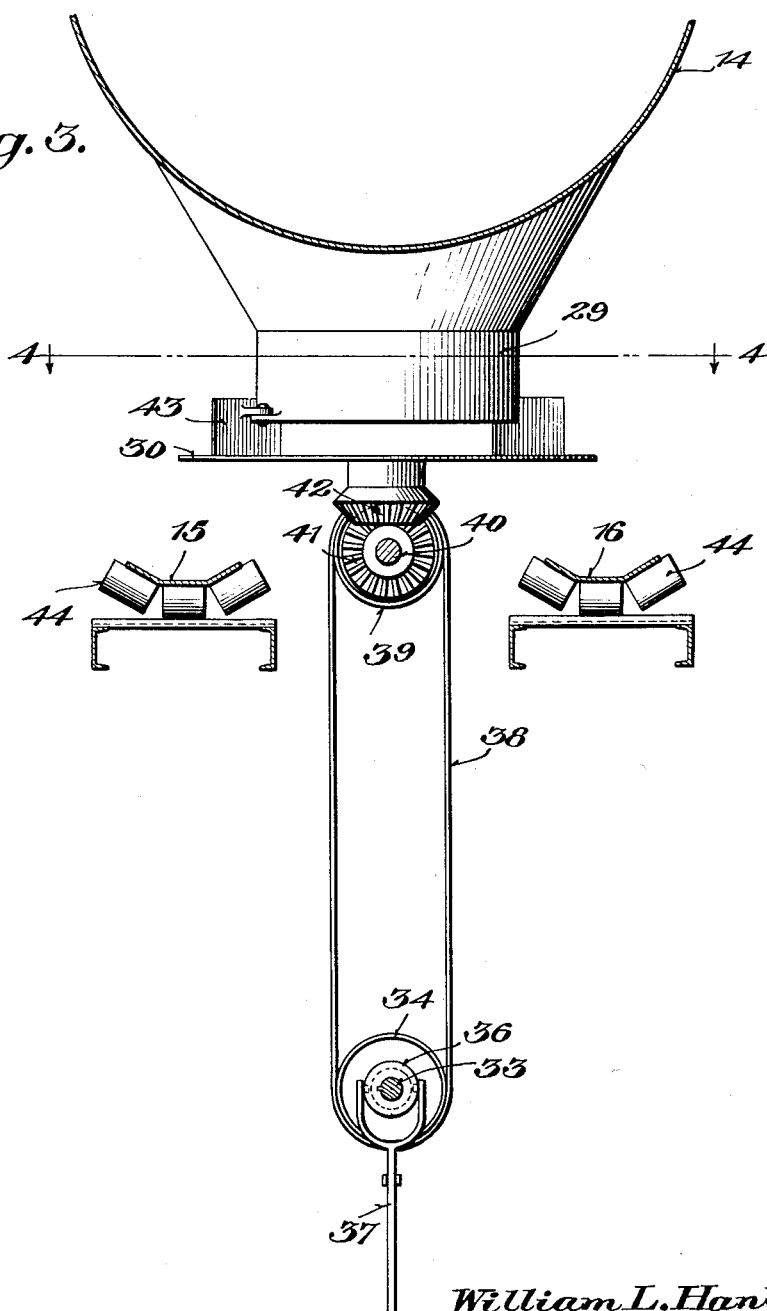

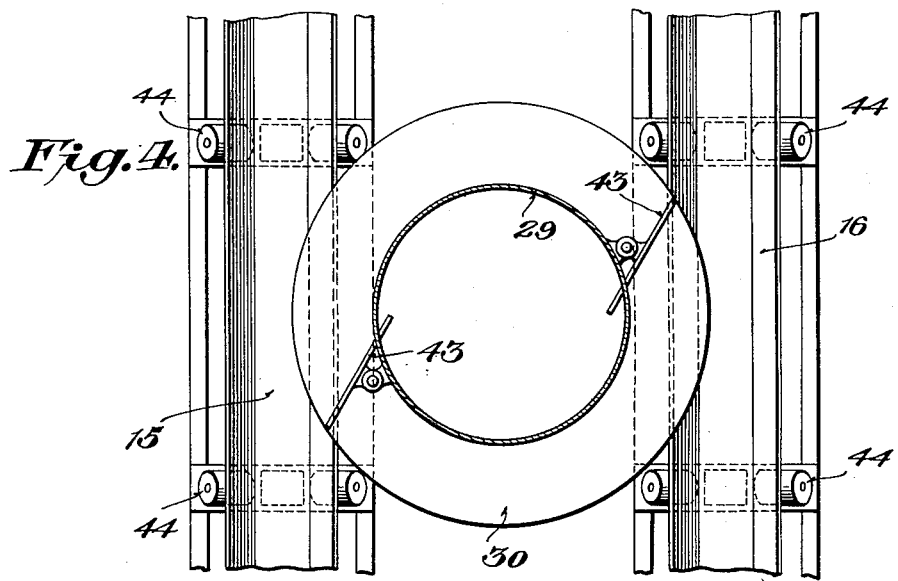

Inventors
William L. Hanley, Jr.,
Dwight B. Hendryx,
George W. Holbrook,
By Louis Prevost Whitaker
Attorney Patented June 21, 1932

1,863,628

UNITED STATES PATENT OFFICE

WILLIAM LEE HANLEY, JR., AND DWIGHT B. HENDRYX, OF BRADFORD, PENNSYLVANIA, AND GEORGE W. HOLBROOK, OF HARTFORD, CONNECTICUT, ASSIGNORS TO HANLEY COMPANY, OF BRADFORD, PENNSYLVANIA, A CORPORATION OF PENNSYLVANIA

PLANT FOR THE MANUFACTURE OF CERAMIC PRODUCTS

Application filed February 4, 1928. Serial No. 251,929.

This invention relates to plants for the manufacture of ceramic products and particularly to plants which are especially adapted for the manufacture of stiff mud bricks and the essential object of the invention is the arrangement of the various elements in the plant in such manner that a large and continuous output is assured with the greatest economy in operation.

While the plant has been specifically designed for the manufacture of stiff mud bricks, we wish it to be understood that our invention is applicable also to the manufacture of any other kind of bricks or ceramic products, particularly coarse ceramic products such for instance as tile.

Another and very important object of our invention is the arrangement of the clay bin in such manner that its longitudinal axis points directly toward the brick machines and lies parallel with the kiln or kilns and the drier tracks and is arranged closely adjacent the railroad sidings so that incoming material for the production of the bricks and the outgoing finished product can be expeditiously handled with a minimum amount of effort on the part of the workers.

In a former arrangement which is particularly illustrated in Hanley Patents 1,641,582, 1,641,583, 1,641,584, and 1,641,585, the storage and shipping points were arranged on the opposite side of the kiln from the brick machines and it was necessary to convey the finished product by way of overhead crane across the exterior tracks and above and across the kilns. This made it necessary to have two sets of side tracks, one for the incoming raw material and the other for the finished product. The present arrangement obviates this difficulty and it will be seen that the clay bin and the brick machine or machines are arranged on the same side of the kiln with the storage and shipping points. This places the storage shed nearer the point where the bricks are unloaded from the kiln cars, decreases the length of the craneways, obviates the necessity of carrying the trays of bricks over the kilns and arranges the clay preparation department and the storage and shipping point closely adjacent to each other so that they are convenient to the railroad sidings. Furthermore it permits the kiln or kilns to be placed in a separate part of the building or in a separate building so that the large amount of heat radiated therefrom will not act to the discomfort of the workers.

In some of the above mentioned Hanley patents where a pair of twin tunnel kilns are employed there is disclosed a pair of brick machines with widely separated off-bearing belts or conveyors from which it is impossible for a setter to reach brick from both belts from one position and if cars are loaded from the belt furthest removed from the drier it is necessary to raise the other belt in order to permit the passage of the car. It is therefore another object of this invention to avoid this difficulty and to provide conveying means capable of receiving the product of two or more brick machines and conveying it across the exterior tracks in such manner that an operator at one station can reach and load bricks from a stream emanating from either machine.

Another object of this invention is the provision of simple and efficient means for feeding different kinds of clay to the independent machines, whereby we are enabled to run two different types of bricks, for instance, manganese and buff at the same time, or may combine different types of clay in various proportions and feed the same to a single brick machine or to both brick machines or to feed one type of clay to either or both machines, and further where two types of bricks are being run at the same time to provide means whereby both types may be loaded by a single operator from a single station onto the same kiln car.

In carrying out our invention we preferably employ a kiln or kilns of the tunnel car type particularly the twin tunnel type which are generally characterized by the fact that they have two tracks running through the kiln parallel to each other so that tunnel cars may be passed therethrough in opposite directions, the bricks travelling in one direction receiving heat from the bricks travelling in the other direction, so that the green bricks are preheated and the fired bricks have a large proportion of their heat absorbed by the green bricks. This effects a very economical operation and also a material saving in initial cost of the kiln and provides for extreme capacity and rapid operation which is essential in the production of rough ceramic products like stiff mud bricks or tile. In the present plant arrangement we have shown two tunnel kilns with four tracks passing therethrough, and four sets of exterior tracks connected at their ends with the tracks of the kilns by transfer tracks upon which operate transfer trucks of any preferred design, but which are capable of receiving and transferring cars from the drier tracks to the kiln tracks and thence from the kiln tracks to storage spaces on certain of the exterior tracks where the bricks or tile are unloaded. The forming machines which are preferably of the auger type are located on the side of the exterior tracks removed from the kiln and the clay preparation department has its clay bin arranged as before stated with its longitudinal axis pointing out directly to the forming machines and parallel with the exterior tracks. The preparation and forming departments are arranged closely adjacent the railroad sidings as is also the storage and shipping point so that incoming material for the formation of the bricks and the burned product may be handled expeditiously from one set of sidings.

Further objects of the invention will appear as the following specific description is read in connection with the accompanying drawings, which form a part of this application, and in which Fig. 1 is a diagrammatic plan view of the plant;

Fig. 2 is a detail elevation of the clay bin;

Fig. 3 is an enlarged section taken on the line 3—3 of Fig. 2;

Fig. 4 is a horizontal section on the line 4—4 of Fig. 3;

Fig. 5 is a detail top plan view of the off-bearing conveyor;

Figure 1:
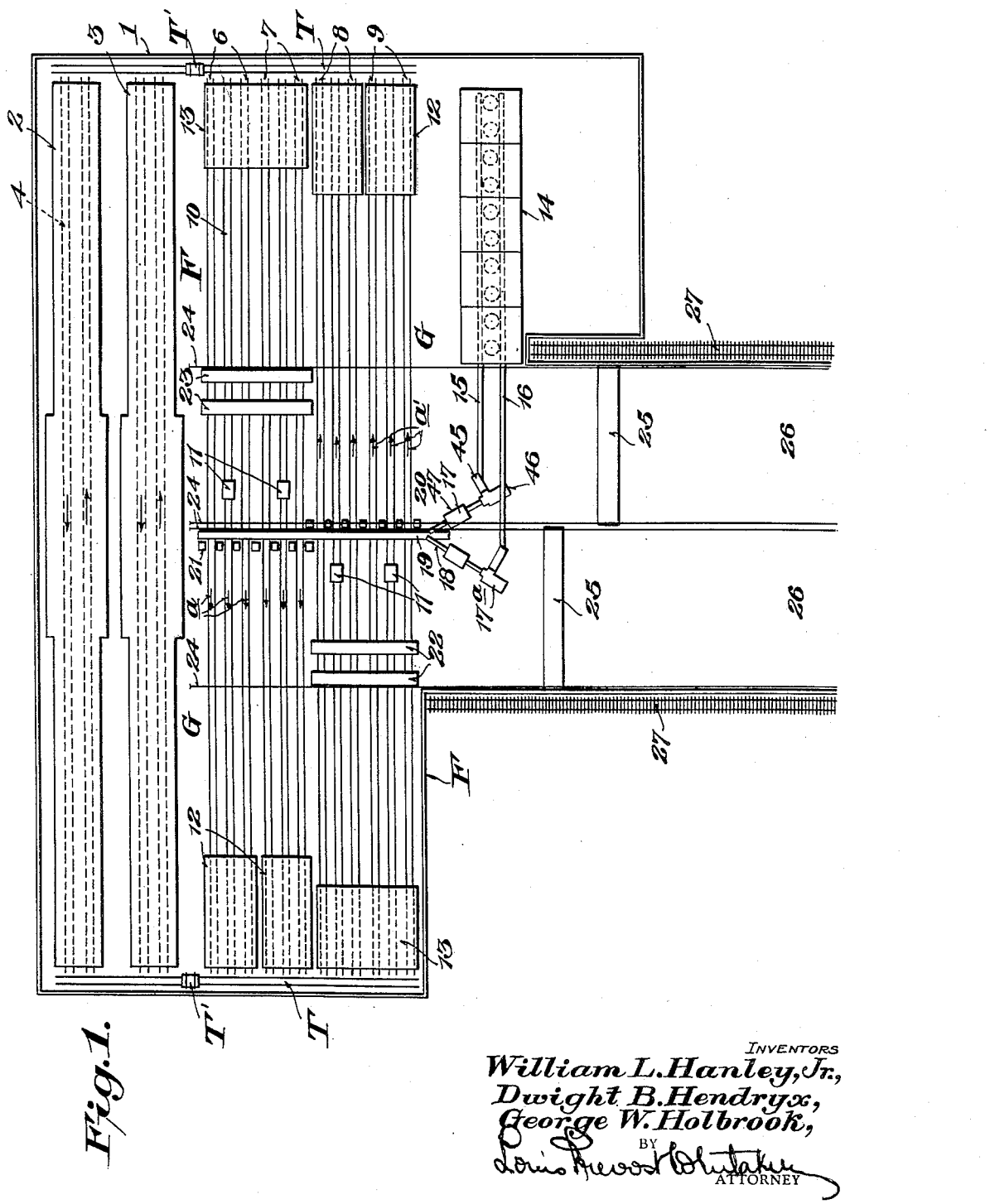

We have shown one embodiment of our invention which will serve for the purpose of illustrating the same but we wish it understood that many modifications might be made without departing in any way from the spirit and scope of the invention as defined in the appended claims.

In this embodiment there is diagrammatically illustrated a building 1 in which is located a pair of twin tunnel kilns 2 and 3 each having two tracks indicated by the dotted lines 4. Adjacent to these kilns and parallel therewith are four sets of exterior tracks arranged in pairs and each pair indicated at 6, 7, 8, and 9 and between each pair is a single track indicated at 10, and on these tracks 10 we prefer to provide a propelling device 11 in the form of an electric locomotive although this type of propelling device may have substituted therefor any other suitable propelling device which will engage the cars arranged on the tracks of each pair as will be hereinafter more fully explained.

At one end of each pair of tracks we provide a dry house 12 and at the opposite end of the same pair of tracks we provide an economizer 13 which is adapted to extract the residue heat of the fired bricks after being transferred from the cooling zone of the kilns and these economizers are adapted to convey this extracted heat to any portion of the plant where it is desired to use the same. As this particular arrangement forms no part of the present invention it will not be described in detail.

Arranged at each end of the plant and extending across the ends of the kiln tracks and exterior tracks perpendicularly to each, are transfer tracks T upon which are operated transfer trucks or cars for receiving the kiln cars from the drier, transferring them to the kiln tracks and for receiving the kiln cars with the fired products thereon from the kiln and transferring them to the exterior tracks where the cars are passed through the economizers. These transfer trucks may be of any suitable design capable of receiving and transferring a kiln car from the drier tracks to the kiln and from the kiln to the economizer tracks, but we prefer to use that type of truck which is illustrated in copending application Serial No. 249,570 filed January 26, 1928.

Located on the side of the exterior tracks remote from the kilns we provide a clay bin 14 which will be particularly described hereinafter, which has extending therefrom parallel to the exterior tracks a pair of conveyors 15 and 16 leading respectively to brick forming machines 17 and 17ª. These brick forming machines deliver their product over slides 18 to the off-bearing conveyor which is generally indicated at 19 and which extends across the exterior tracks at such elevation as to permit the tunnel cars to pass therebeneath. Arranged adjacent the off-bearing conveyor we provide a plurality of setting stations 20 for the pairs of tracks 8 and 9 and a similar series of setting stations 21 for the pairs of tracks 6 and 7. Immediately adjacent these setting stations we provide pairs of sorting or unloading platforms 22 and 23 the former of which extend across the pairs of tracks 8 and 9 and the latter of which extend across the tracks 6 and 7. These platforms are preferably elevated above the pairs of tracks over which they extend at such a height that partially loaded cars may pass beneath the same and in sorting and removing the bricks from the tunnel cars coming up to these sorting stations we preferably unload one-half of the car from the top tier downwardly on the first of the pair of platforms approached by the car, then pass the car with the remainder of its load beneath the platforms and unload the rest from the platform adjacent the off-bearing conveyor. This enables us to bring up fresh cars to the unloading platforms after the preceding car has been partially unloaded and to then immediately pass the unloaded cars beneath the off-bearing conveyor where they can be loaded with fresh green brick.

Extending across all of the pairs of exterior tracks and arranged perpendicular thereto are overhead craneways 24 upon which cranes 25 are adapted to travel and may be propelled in any suitable manner. The products removed from the cars at the sorting and unloading stations are carried by such craneways to a storage and shipping point generally indicated at 26. This point is convenient to the railway tracks 27 where cars are ready to receive the finished products and transport them to any suitable point.

As shown in Figs. 2 and 3 the clay bin which is generally indicated at 14 is of the suspended bunker type divided by partitions 28 into separate compartments which may contain different kinds of clay or may all contain the same kind of clay. Each compartment is provided with a circular discharge spout 29 below which and spaced therefrom is a rotatably mounted disc 30 supported in bearings on a bracket 31 carried by one of the uprights 32.

Arranged parallel with the longitudinal axis of the bin and beneath the same is a driving shaft 33 having a series of pulleys 34 loosely mounted thereon and each provided with a clutch face 35 adapted to be engaged by a corresponding clutch face on a sliding collar 36 splined on the shaft 33. These collars 36 are each independently controlled by shipper levers 37 so that the driving pulleys may be disconnected from the shaft 33 when desired. Each pulley 34 is connected by a belt 38 to a corresponding pulley 39 on a stub shaft 40 journalled in bearings carried by the bracket 31. This stub shaft carries at its opposite end a bevelled pinion 41 meshed with a similar pinion 42 on the lower end of a stud shaft which is secured centrally to the feeding disc 30. As shown in Figs. 2 and 3 each feeding disc is spaced from the lower end or discharge of the spout 29 so as to permit the clay discharging from the bin to rest upon the feeding disc 30 and work outwardly toward its marginal edge under the influence of the plows 43 adjustably secured to diametrically opposite points on the discharge spout 29. These plows depend from the spout as shown in Fig. 3 and contact with the upper surface of the feeding disc 30 and when arranged at an angle as shown in Fig. 4 clay resting upon the feeding disc 30 will, during the rotation of such disc, be engaged by the plows and will be forced over the peripherial edge of the disc where it drops onto the conveyors 15 or 16 and will be conveyed to the brick machines 17 or 18. It will be seen that the plows may be adjusted so as to feed different quantities of clay to the conveyors by turning them in either direction. The conveyors are preferably in the form of flexible belts held by rollers 44 in substantially trough shaped position in cross section and the belts may be driven by any suitable mechanism, but forming no part of the present invention, such mechanism has not been illustrated.

The brick machines which we preferably employ usually embody a plug mill 45, a driving auger 46, a cutter 47 and an inclined slide 18 which deliver the bricks formed by the auger and cutter to the off-bearing conveyor 19. The preferred type of off-bearing conveyor is disclosed in Fig. 1 as a wide belt 48 running over the pulley 48$^a$ which is continuously driven but we may employ other forms of off-bearing conveyors, for instance like that disclosed in Fig. 6 or like that disclosed in Fig. 7 both of which will be described later. In the preferred form of arrangement between the forming machines 17 and 17$^a$ and the off-bearing conveyor 19 the slides 18 are diagonally disposed to the belt 48 and inclined downwardly from the cutter 47 where the discharge ends are located in close proximity to the upper surface of the belt. As shown in Fig. 5 the discharge ends of the slides 18 are arranged at an angle to the longitudinal axis thereof so that as the bricks, which travel down the slides transversely to the longitudinal axis thereof, are discharged onto the belt, one edge of the brick, namely the inner edge, is contacted by the belt 48 slightly in advance of its outer edge so that the drag of the conveyor on the contacted edge of the brick will turn the same in an arc as shown in Fig. 5, the brick fulcruming at its outer end on the slide by reason of its frictional contact therewith. The bricks are thus turned in an arc as shown in Fig. 5 so that when their entire under surface is resting upon the belt they will be arranged transversely thereto and in spaced relation one to the other. The belt 48 is of such width as to receive two bricks on edge extending transversely of the belt which enables the operator or setter at any station in the series 20 or 21 to remove bricks from the belt in either stream which is formed by the bricks from the separate slides.

We preferably arrange the feeding of the bricks and the slides with relation to the belt 48 in such manner that the bricks in opposite streams are arranged in staggered relation so that a brick may be picked from the farthest stream and pulled toward the operator without being brought into contact with the bricks in the nearest stream.

Figure 6:
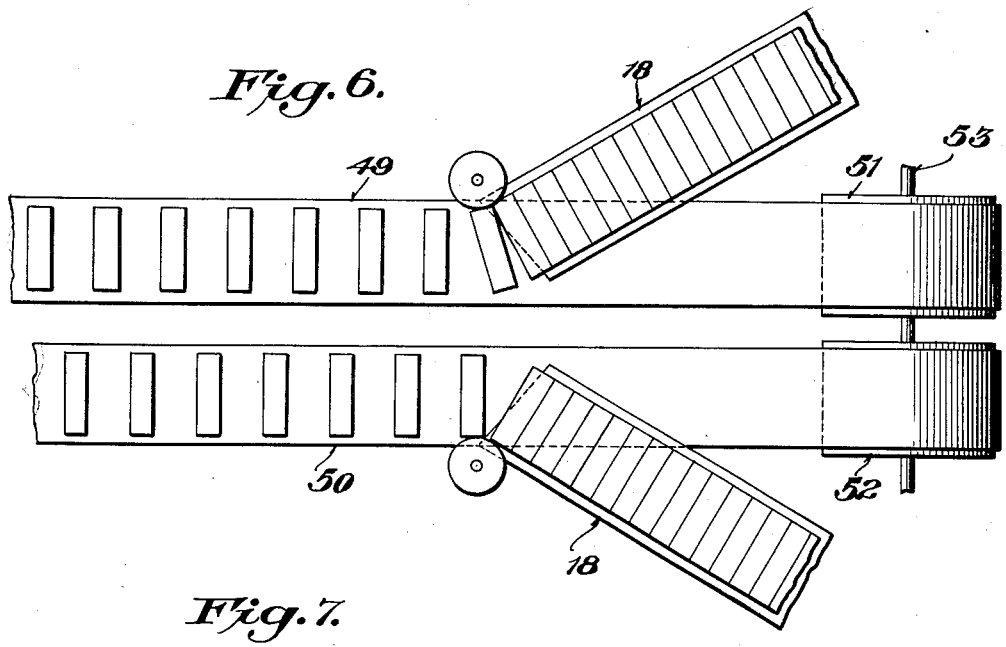
Fig. 6 is a similar view showing a modified type of off-bearing conveyor.

In a modification of the off-bearing conveyor as disclosed in Fig. 6 the same is constructed of two belts 49 and 50 running over pulleys 51 and 52 respectively both of which are keyed to the same shaft 53 which is continuously driven in any suitable manner. The bricks from the forming machine 17 are delivered to the belt 49 while the bricks from the forming machine 17ª are delivered to the belt 50. These belts are arranged in close proximity to each other and in the same horizontal plane and their combined width is equal to or only slightly greater than the full width of the belt 48. In this manner the operator at any one setting station is enabled to remove bricks from either belt with the same facility as would obtain in the removal of bricks from the belt 48.

Figure 7:
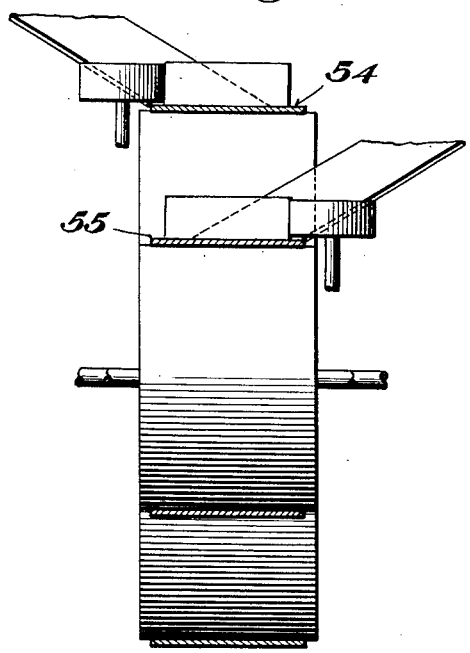
Fig. 7 is a detail vertical sectional view showing a further modified type of conveyor.

In the modified form shown in Fig. 7 belts 54 and 55 are mounted to be driven at the same or different speeds and with the belt 55 arranged within the belt 54 so that the operative flights of these belts are in different horizontal planes and the bricks on the belt 54 therefore travel in a stream superposed with respect to the stream on the belt 55. Either of the machines 17 or 17ª may be arranged to deliver bricks to either of the belts but the preferred arrangement is that the machine 17 deliver its supply of bricks to the belt 54 while the machine 17ª delivers its supply of bricks to the belt 55.

With either of the foregoing arrangements, that is the arrangements of Figs. 5, 6, or 7 one of the machines may be arranged in line with the length of the belt of the off-bearing conveyor and with this arrangement coupled with the modification of Fig. 6 the machine 17 could be arranged in line with the belt 49 or the machine 17ª could be arranged in line with the belt 50. In the arrangement of Fig. 7 the alignment of one of the machines with the off-bearing conveyor would be such that the machine was aligned with the length of the belt 54 as the belt 55 is within the belt 54 and therefore could not have the machine aligned with its length.

In the operation of the plant clay is brought into the bin either at the end of the building or beneath the craneways 24, and being fed from these bins as previously described, is carried by the conveyors 15 and 16 to the brick machines 17 and 17ª. The bricks formed in these machines travel down the inclined slides 18 and are received by the off-bearing conveyor belt or belts, as the case may be, where they are conveyed in a direction across the exterior tracks. Setters operating at the stations 20 or 21 may remove these bricks from either stream on the belt or belts and set them on kiln cars on the tracks 6, 7, 8 or 9. Thus bricks set on cars on the tracks 6, and 7 travel in the direction of the arrows $a$, while those set on kiln cars on the tracks 8 and 9 travel in the direction of the arrows $a_1$. When a car is loaded on either of the aforesaid tracks the electric locomotive arranged between the pairs of tracks is brought up and through suitable mechanism engages the car and pushes the same into the drier 12. After being treated in the drier to remove all occluded water, the transfer truck is operated to remove the car from the drier, place it on the truck and carry it to one of the kilns 2 or 3. After being pushed through the kiln the car of fired products is then again taken up by the transfer truck and conveyed to the opposite ends of the tracks upon which it was moved into the drier. There the car passes through the economizer where substantially all residual heat is taken off and the car then moved through the storage space F to the sorting benches or unloading platforms. After one-half of the load of bricks on the car has been removed by the sorters on the first platform reached by the car, the car is passed beneath this platform and the remainder of the load is removed from the car and the car moved forward in an empty condition to be reloaded by the setters at the stations 20, 21. The fired bricks removed at the sorting stations are preferably placed in containers of any suitable sort, raised by the cranes and carried by them over the craneways to the shipping and storing points 26.

It will be seen that the cars loaded with green bricks in passing over the tracks 8 and 9 from the setting stations 20 travel in a direction opposite to the travel of the clay from the bin to the forming machines, but this is not a retrograde step by any means, as the cycle of movement is just as continuous and uninterrupted over these tracks as it is in passing over the tracks 6 and 7 in the reverse direction.

In the majority of instances in the operation of the plant it is impossible to operate the brick machines or the forming machines for the full time during the week, but it is extremely desirable in the economic operation of the plant to continuously operate the tunnel kilns twenty-four hours in each day and every day in the week, and in order to do this and to permit the forming machines to remain idle at certain periods we provide sufficient storage space on the exterior tracks between the drier and the off-bearing belt, and between the off-bearing belt and the economizer so that a number of cars loaded with green brick may be stored upon the exterior tracks between the off-bearing belt and the drier, and a number of cars loaded with fired brick may be stored on the exterior tracks between the economizer and the unloading platform. The storage spaces for green brick are indicated generally by the reference character G and the storage spaces for fired brick indicated by the letter F.

With this arrangement the crews in the preparation department and at the forming machines may continue their operations until the kilns are filled and the storage spaces G filled with green brick. Then they may cease their operations and thereafter the operation of the driers and kilns continues by reason of the quantity of green brick stored on the tracks in the spaces G. During this latter period the cars discharged from the kiln and passing through the economizers can be stored on the tracks in the spaces F and need not be delivered to the cranes until the forming operation is started up again.

With the arrangement of clay bins it will be readily seen that we are enabled to supply the different compartments thereof with clay of different character and with the disc feeders feed clay of one character to one machine and clay of another character to another machine or mix two or more kinds of clay and feed the same to one or both machines or feed mixed clay to one machine and another type of clay to the other machine.

It will also be seen that we have so associated all of the mechanism required for completely forming, drying and firing rough ceramic products in such manner that the clay practically travels from its raw state in a continuous path of movement without any retrograde steps to the finished article.

With the present arrangement having the sorting benches within the scope of the craneway and the craneway extending away from the kiln on the same side with the exterior tracks, we are enabled to bring all operations close to one another so that if one crew is short of help recruits may be drafted from other operations rapidly and without neglecting any one particular operation, all operations being located on the side of the exterior tracks remote from the kiln.

We also wish it observed that with the particular arrangement of clay bin and off-bearing belt that the setters at the various stations 20 or 21 may set bricks on the kiln cars going in either direction and may also set bricks of different characters on the same car or on different cars so that they will pass through different kilns. The arrangement of the plant also facilitates the loading of the tunnel cars with the green bricks at a substantially central point in the line of the exterior tracks from one of the off-bearing belts, which preferably extend over all the tracks, the cars then proceeding in opposite directions on the different sets of tracks to and through the driers, and being then transferred to twin tunnel kilns, pursuing their course in opposite directions therein, thus making two continually moving circuits for the cars, in which the cars are always moved progressively forward, or laterally, and never rearwardly, and all the cars loaded with the finished product from both circuits are brought to an approximately central point where they are unloaded and the burned bricks are thence conveyed to a common shipping and storage point located on the same side of the kiln with the exterior tracks and the forming machine. This enables us to run one kind of brick, for instance a manganese brick, through one kiln, say kiln 2, and run another kind of brick, for instance buff brick, through kiln 3, or we may if desired load manganese and buff brick on the same car or cars and run them through either kiln. In fact cars travelling in the same direction may carry bricks of different characters loaded by the same setters.

What we claim is:

1. In a plant for the manufacture of ceramic products, the combination with a burning kiln having tracks for tunnel cars moving therethough, a plurality of exterior tracks for tunnel cars located alongside of the kiln and extending parallel thereto, transferring means at each end of the kiln for transferring tunnel cars between the exterior tracks and kiln tracks and vice versa, of forming machines located on the side of the exterior tracks remote from the kiln, a single off-bearing conveyor extending therefrom over said exterior tracks and adapted to receive articles from said machines, setting stations adjacent said off-bearing conveyor whereby operators thereat may remove articles delivered to said off-bearing conveyor from either machine and set the same in tunnel cars, and means for delivering raw material to either machine.

2. In a plan for the manufacture of ceramic products, the combination with a burning kiln having tracks for tunnel cars moving therethrough, exterior tracks for tunnel cars located alongside of the kiln and substantially parallel therewith, transfer means at each end of the kiln for transferring tunnel cars between the exterior tracks and kiln tracks and vice versa, of forming machines located on the side of the exterior tracks remote from the kiln, a single off-bearing conveyor extending therefrom over said exterior tracks, a source of clay supply arranged on the side of said exterior tracks with the forming machine, and means parallel with the exterior tracks for feeding clay from said source to said machines.

3. In a plant for the manufacture of ceramic products, the combination with a burning kiln having tracks for tunnel cars moving therethrough, exterior tracks for tunnel cars located alongside of the kiln and substantially parallel therewith, transfer means at each end of the kiln for transferring tunnel cars between the exterior tracks and kiln tracks and vice versa, of forming machines located on the side of the exterior tracks remote from the kiln, an off-bearing conveyor extending therefrom over said exterior tracks, a clay bin arranged on the side of the exterior tracks with the forming machine and having its longitudinal axis substantially parallel with said tracks, and means for feeding clay from said bin to said machine.

4. In a plant for the manufacture of ceramic products, the combination of a burning kiln having tracks for tunnel cars moving therethrough, exterior tracks for tunnel cars located alongside of the kiln and substantially parallel therewith, transfer means at each end of the kiln for transferring tunnel cars between the exterior tracks and kiln tracks and vice versa, of forming machines located on the side of the exterior tracks remote form the kiln, a single off-bearing conveyor extending therefrom over said exterior tracks, a source of clay supply arranged on the side of said exterior tracks with the forming machine, means parallel with the exterior tracks for feeding clay from said source to said machines, an unloading platform extending over said exterior tracks, said platform located adjacent the off-bearing belt, and means for receiving the burned product from the unloading platform and conveying it to a shipping and storing point arranged at the same side of the exterior tracks as the source of clay supply.

5. In a plant for the manufacture of ceramic products, the combination with a burning kiln having tracks for tunnel cars moving therethrough, a plurality of exterior tracks for tunnel cars located alongside said kiln and substantially parallel thereto, transferring means at each end of the kiln for transferring tunnel cars between the exterior tracks and the kiln tracks and vice versa, of forming machines located adjacent to the exterior tracks, a single off-bearing conveyor extending therefrom over said exterior tracks and adapted to receive the product of said machines, a drier located at one end of said exterior tracks between the off-bearing conveyor and the transferring means, setting stations adjacent the off-bearing conveyor and between the same and the drier whereby operatives thereat may load the product from either machine from the off-bearing belt to tunnel cars on the exterior tracks, an economizer between the off-bearing conveyor and the other transferring means, unloading platforms between the off-bearing conveyor and said economizer, a craneway extending transversely across the exterior tracks and over said unloading platform, and a movable crane thereon for transporting burned bricks from the unloading platform to a storing and shipping point on the same side of the exterior tracks as the forming machines but remote from the kiln.

6. A plant for the manufacture of ceramic products comprising a burning kiln, exterior tracks for tunnel cars arranged adjacent to said kiln and substantially parallel thereto, of forming machines, and an off-bearing conveyor arranged to receive the bricks from each forming machine in separate streams lying closely adjacent to one another whereby an operative may remove bricks from either stream in setting the load upon the cars travelling over the exterior tracks to the kiln.

7. A plant for the manufacture of ceramic products comprising a burning kiln, exterior tracks for tunnel cars arranged adjacent to said kiln and substantially parallel thereto, an off-bearing conveyor extending across said tracks substantially perpendicular thereto and elevated a sufficient distance to permit tunnel cars to pass therebeneath, forming machines, and means for delivering the product from said forming machines to said off-bearing conveyor in separated parallel streams sufficiently close to one another to permit an operative at a setting station to remove an article from either stream in setting the same upon tunnel cars.

8. A plant for the manufacture of ceramic products comprising a burning kiln, exterior tracks arranged at one side of said kiln and substantially parallel thereto, an off-bearing conveyor extending across said tracks, forming machines arranged at the side of the tracks remote from the kiln and adapted to deliver their product to said off-bearing conveyor, a clay bin on the same side of the tracks as the forming machines, and conveyors arranged parallel to said exterior tracks and adjacent thereto on a side remote from the kiln for feeding clay from said bin to said machines.

9. A plant for the manufacture of ceramic products comprising a burning kiln, an off-bearing conveyor, forming machines adapted to deliver their product to said off-bearing conveyor, a sectional clay bin, conveyors arranged parallel to said kiln for feeding clay from said bin to said machines, means for controlling the supply of clay from either of the sections of said bins to said conveyors, and means for controlling the supply to either of said conveyors.

10. In a plant for the manufacture of ceramic products, the combination with a plurality of twin tunnel kilns each having two parallel tracks for tunnel cars moving in opposite directions therethrough, a plurality of sets of exterior tracks for each of said kilns, arranged alongside of said kilns and substantially parallel thereto, transferring means at each end of said kilns, driers arranged adjacent one of said transferring means and encompassing one end of each set of said exterior tracks, economizers arranged adjacent the other transferring means and encompassing the opposite ends of each of said sets of exterior tracks, an off-bearing conveyor extending across all of said exterior tracks, unloading platforms extending across said exterior tracks between the off-bearing conveyor and the economizers, loading stations between the off-bearing conveyor and the driers, forming machines located on the side of the exterior tracks remote from the kilns and including means for feeding the product therefrom to the off-bearing conveyor, means for supplying clay to said forming machines arranged adjacent said exterior tracks and on the side thereof remote from the kilns, overhead craneways arranged over said unloading platforms, and moving cranes thereon for carrying the material from the unloading platforms to shipping and storing points adjacent and on the same side of the exterior tracks with the clay feeding means.

11. A plant for the manufacture of ceramic products comprising a burning kiln, exterior tracks for tunnel cars arranged adjacent to said kiln and substantially parallel thereto, of forming machines, means arranged to convey the articles from said machines in separate closely adjacent streams across the exterior tracks, and setting stations between said tracks whereby operatives thereat may remove articles from either stream and load the same on tunnel cars on said exterior tracks.

12. A plant for the manufacture of ceramic products comprising a burning kiln, exterior tracks arranged at one side of said kiln and substantially parallel thereto, an off-bearing conveyor extending across said tracks, forming machines adapted to deliver their product to said off-bearing conveyor, a clay bin, conveyors arranged parallel to said exterior tracks and adjacent thereto on a side remote from the kiln for feeding clay from said bin to said machines, a shipping and storage station located on the same side of the exterior tracks as the clay bin and adjacent thereto, and means for delivering the fired product to the shipping and storage point.

13. In a plant for the manufacture of rough ceramic products, the combination with a burning kiln, for kiln cars, and a forming machine, of a sectional clay bin, and conveyors leading from said bin to said forming machine, and means for controlling the supply from either section of said bin to either of said conveyors.

In testimony whereof we affix our signatures.

WILLIAM LEE HANLEY, Jr.
DWIGHT B. HENDRYX.
GEORGE W. HOLBROOK.